(12) United States Patent

Lignon

(10) Patent No.: US 12,681,314 B2

(45) Date of Patent: Jul. 14, 2026

(54) DUAL VISION DEVICE AND ASSOCIATED METHOD

(71) Applicant: PLTECH, Joinville le Pont (FR)

(72) Inventor: Patrick Lignon, Grimaud (FR)

(73) Assignee: PLTECH, Joinville le Pont (FR)

( * ) Notice: Subject to any disclaimer, the term of this patent is extended or adjusted under 35 U.S.C. 154(b) by 0 days.

(21) Appl. No.: 19/418,558

(22) Filed: Dec. 12, 2025

(65) Prior Publication Data

US 2026/0169302 A1 Jun. 18, 2026

(30) Foreign Application Priority Data

Dec. 13, 2024 (FR) ........................................ 2414125

(51) Int. Cl.
*G02B 27/01* (2006.01)

(52) U.S. Cl.
CPC .. *G02B 27/0176* (2013.01); *G02B 2027/0159* (2013.01); *G02B 2027/0178* (2013.01)

(58) Field of Classification Search
CPC ........ G02B 27/0176; G02B 2027/0159; G02B 2027/0178
USPC .......................................... 359/630; 345/7–9
See application file for complete search history.

(56) References Cited

U.S. PATENT DOCUMENTS

| 6,084,555 A | 7/2000 | Mizoguchi et al. |
| 2005/0146487 A1 | 7/2005 | Travers et al. |
| 2015/0138645 A1 | 5/2015 | Yoo et al. |

OTHER PUBLICATIONS

Search Report issued in French Application No. 2414125, dated Jun. 30, 2025.

*Primary Examiner* — William Choi

(74) *Attorney, Agent, or Firm* — Knobbe, Martens, Olson & Bear, LLP

(57) ABSTRACT

A dual vision device designed to generate a second vision in addition to a direct vision of a user, independent of the direct vision and located in the upper part of the field of vision of the user. The dual vision device includes a display assembly carried by a support, the display assembly including two display units designed to generate the second vision in the upper part of the field of vision of the user, each display unit including an eyepiece and a screen chosen so that each display unit forms an image clearly viewable by a distinct eye of the user under the following conditions: the support is inclined so that the image formed by each display unit is viewable only in the upper part of the field of vision of the user when the user looks upwards, and the distance between the eyes of the user and the entrance of the eyepieces is greater than or equal to a predetermined distance, the predetermined distance being chosen so as to enable the insertion of glasses between the eyes of the user and the display unit.

15 Claims, 9 Drawing Sheets

DUAL VISION DEVICE AND ASSOCIATED METHOD

INCORPORATION BY REFERENCE TO ANY PRIORITY APPLICATIONS

Any and all applications for which a foreign or domestic priority claim is identified in the Application Data Sheet as filed with the present application are hereby incorporated by reference.

TECHNICAL FIELD

The present disclosure relates to a dual vision device designed to generate a second vision, in addition to a direct vision of the user, independent of the direct vision. The present disclosure also relates to a method for generating the second vision.

BACKGROUND

The emergence of augmented reality devices has highlighted the possibility of a user having additional visual information beyond that provided by direct vision, also known as natural vision. Such information can offer a gain in productivity in the industrial sector, by representing plans or technical notes, for example, but can also be useful for video sharing or entertainment purposes.

Devices that overlay images onto the direct view have the disadvantage of not being able to display a full image legibly, mainly due to the surrounding brightness. A full image is a rectangular image in which each pixel has a non-zero opacity.

Monocular devices with a screen, which are placed in front of one eye, which thus enables access to additional visual information with this eye and direct vision with the other eye, are already known. However, most users of monocular devices must close one eye and keep the other open to alternate between direct vision and additional visual information, which is uncomfortable, tiring and requires time to adapt when switching from one vision to the other.

There are also glasses equipped with screens that display video content. However, these are generally located close to the eyes of the user, making the use of the device incompatible with wearing glasses, for example. Yet it is useful for the device to be usable in conjunction with prescription glasses, in order to provide clear additional visual information to the greatest number of users.

SUMMARY

The aim of the present disclosure is to propose a dual vision device that enables a user to switch simply and more comfortably from direct vision to additional visual information, while ensuring that the dual vision device is suitable for a user wearing prescription glasses.

To this end, the present disclosure relates to a dual vision device designed to generate a second vision in addition to a direct vision of a user, independent of the direct vision, with the second vision being located in the upper part of the field of vision of the user so that the user has access to the second vision only by looking upwards, and otherwise has access to their direct vision, the device comprising:

a support for a display assembly, an adjustment unit, designed to set and adapt the support to the head of the user so that the display assembly carried by the support is viewable only in the upper part of the field of vision of the user when the user looks upwards, the display assembly carried by the support, with the display assembly comprising two display units designed to generate the second vision in the upper part of the field of vision of the user, each display unit comprising an eyepiece and a screen that are chosen so that each display unit forms an image clearly viewable by a distinct eye of the user under the following conditions:

the support is inclined so that the image formed by each display unit is viewable only in the upper part of the field of vision of the user when the user looks upwards, and the distance between the eyes of the user and the entrance of the eyepieces is greater than or equal to a predetermined distance, the predetermined distance being chosen to allow the insertion of glasses between the eyes of the user and the display unit.

According to other advantageous aspects of the present disclosure, the dual vision device comprises one or more of the following features, taken individually or in any technically possible combination:

the predetermined distance is between 20 millimeters and 28 millimeters, preferably between 22 millimeters and 25 millimeters;

the screen of each display unit has a size chosen so that the image formed by the display unit is readable without the user having to move their eyes laterally to view the edges of the image;

each eyepiece is formed of a set of lenses placed together, preferably at least four lenses placed together, the surface of the lens at the entrance of the eyepiece being substantially flat;

each display unit comprises a frame in which the screen and the eyepiece are inserted, the frame having a parallelepiped shape with a conical base at the entrance of the eyepiece;

each display unit comprises a frame in which the screen and the eyepiece are inserted, the frame having a border, at the entrance of the eyepiece, whose thickness is less than or equal to 2 millimeters, particularly less than or equal to 1.4 millimeters;

each display unit comprises a frame in which the screen and the eyepiece are inserted, the frame having a dioptric adjustment mechanism that enables the user to adjust the focus of each display unit;

the support comprises a closure plate with two housings in which the display units are received, the display assembly comprising an interpupillary adjustment mechanism mounted on the closure plate and designed to synchronize the movement of the two display units, the interpupillary adjustment mechanism comprising a yoke on which two rods are mounted and a locking knob for the rotation of the yoke, each rod being fixed to a distinct display unit that enables the synchronous movement of each display unit when the locking knob is in the unlocked position;

the two display units also comprise two tabs on either side of the closure plate for each housing, designed to cover the space caused by the interpupillary adjustment, to prevent the entry of light and dust;

the display unit comprises an inner portion located inside the support and a protruding portion projection from the support, and wherein the screen is received inside the inner portion, the eyepiece being received inside the protruding portion;

the protruding portion of the display unit has a depth less or equal to 4 millimeters.

The present disclosure also comprises a method for generating a vision, independent of a direct vision of a user, the second vision being located in the upper part of the field of vision of the user so that the user has access to the second vision only by looking upwards, and otherwise has access to their own direct vision, the method being implemented by a dual vision device as described above, the method comprising the following steps:

the setting and adaptation of the support of the dual vision device to the head of the user so that the display assembly carried by the support is viewable only in the upper part of the field of vision of the user when the user looks upwards, and the visualization by the user of the second vision provided by the dual vision device in the upper part of the field of vision of the user when the user looks upwards, and otherwise of their own direct vision.

BRIEF DESCRIPTION OF THE DRAWINGS

The present disclosure will appear more clearly upon reading the following description, given solely by way of non-limiting example, and made with reference to the drawings in which.

DETAILED DESCRIPTION

Figure 1:
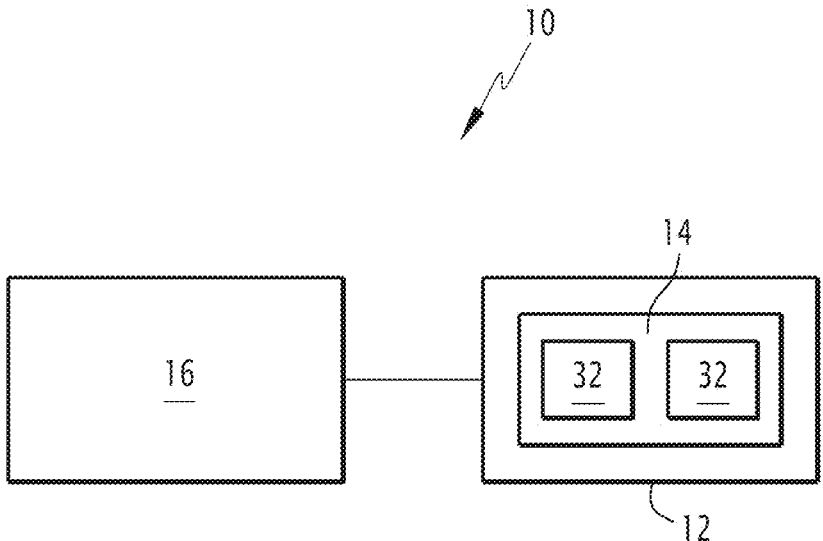
FIG. 1 is a schematic representation of an example of a dual vision device according to the present disclosure.

An example of a dual vision device 10 is schematically illustrated in FIG. 1.

Such a device 10 comprises a support 12 for a display assembly 14, the display assembly 14 itself and an adjustment unit 16, designed to adapt and set the support 12 to the head of a user 18.

The device 10 is designed to generate a second vision independent of the natural vision of the user 18, intended to display visual information that is additional to the direct vision. The second vision is designed to be generated through the display assembly 14, in the upper part of the field of vision of the user 18. The user thus has access to the second vision only by looking upwards, and otherwise has access to their own direct vision.

For this purpose, as will be described later in the description, the adjustment unit 16 is particularly adapted to position the support 12 in relation to the head of the user, so that the display assembly 14 is viewable in the upper part of the field of vision of the user 18 when the user looks upwards.

A spherical reference frame is defined, centered at a virtual point located between the focal points of the two eyes of the user18. The latitude and longitude of a point in space are defined with reference to the spherical reference frame. The latitude is defined as zero at the horizon, positive above the head of the user, and negative at the feet of the user 18.

A field of vision of the user is defined as the extent of space that the user can scan with their gaze while being immobile. The upper field of vision is defined as the portion of the field of vision that the user sees by looking upwards. More particularly, the upper field of vision is considered as the set of points with positive latitude greater than 10° within the field of vision of the user 18.

The support 12 holds the display assembly 14.

Figure 2:
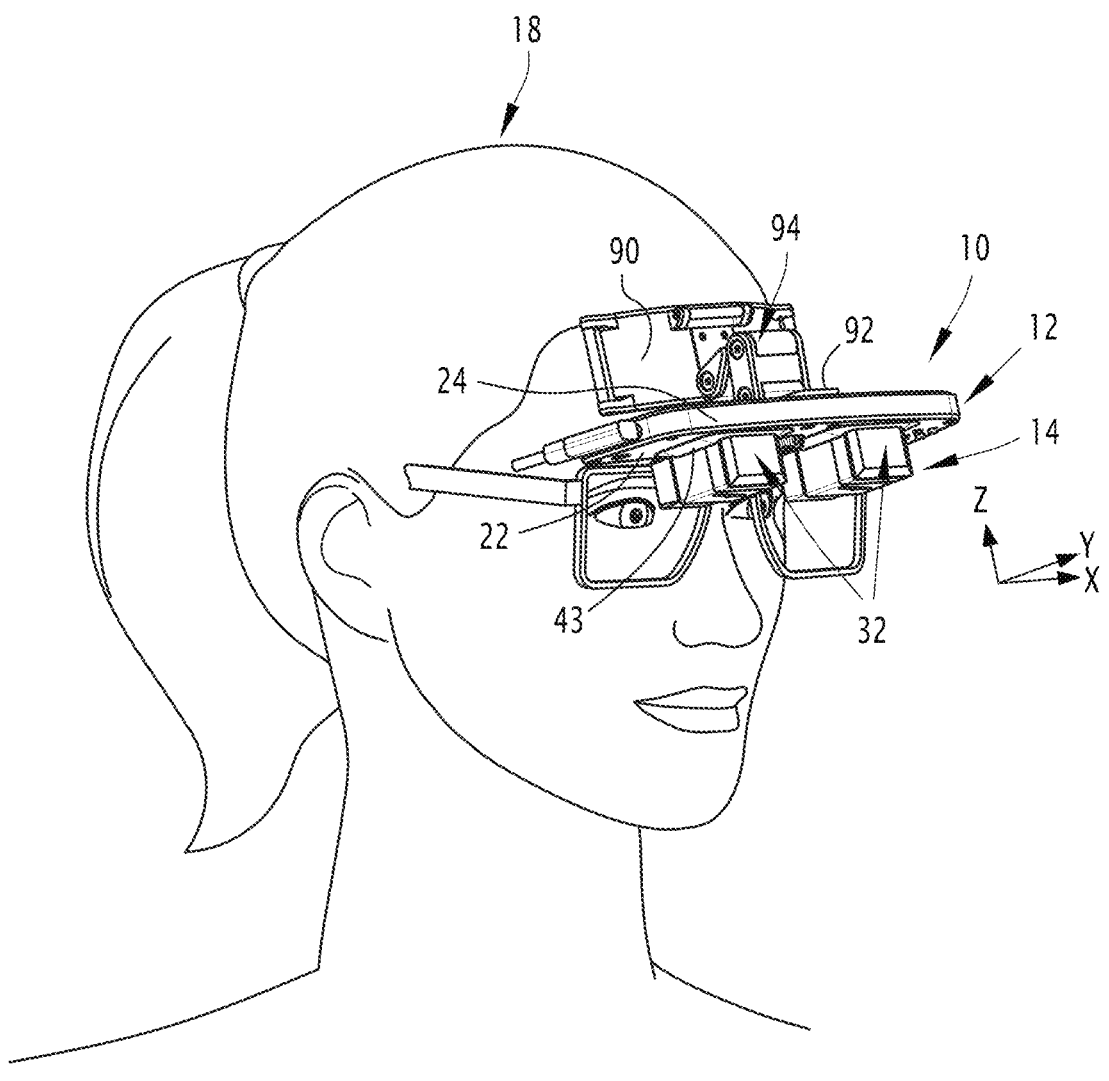
FIG. 2 is a schematic perspective representation of a user wearing an example of a dual vision device.

With reference to FIG. 2, the support 12 extends mainly in length in a lateral direction X, in width in a transverse direction Y and in thickness in an elevation direction Z. When the support 12 is positioned so that the display assembly is viewable in the upper part of the field of vision of the user 18, the lateral direction X is substantially parallel to the axis connecting the focal points of the eyes of the user 18.

Figure 4:
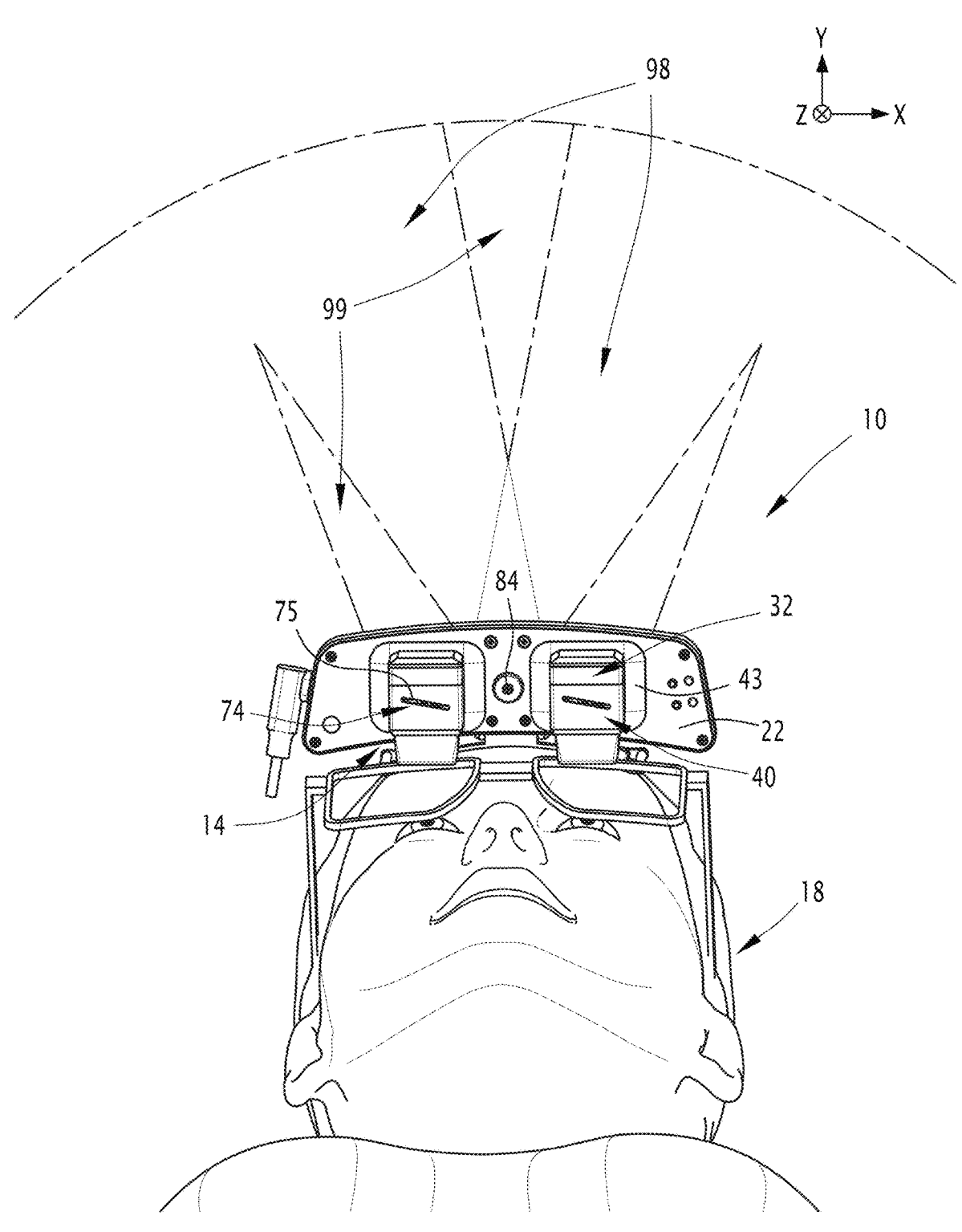
FIG. 4 is a bottom view of the user and the dual vision device of FIG. 2.

The support 12 has a substantially polyhedral shape, for example, some faces of which may be curved, as shown in FIG. 4. In a variant, the support 12 has any geometric shape that extends mainly in the lateral direction X.

The support is made of a material comprising carbon, for example, such as a carbon fiber-reinforced composite material.

Preferably, as illustrated in the examples of FIGS. 2 to 5, the support 12 includes an upper plate 20 and a closure plate 22, linked to each other by a wall 24. The support thus defines an internal volume in which an electronic card 28 is received, for example. The electronic card 28 defines a data reading system and, advantageously, has a video data reading connector. The data reading system is intended to control the display assembly 14, to display the received data. In a variant, the electronic card 28 receives video data without a wired connection, such as via an antenna.

The upper plate 20 extends in a plane generated by the lateral direction X and the transverse direction Y, orthogonal to the lateral direction X. The wall 24 extends in the elevation direction Z orthogonal to the plane of the upper plate 20.

Advantageously, the closure plate 22 has two housings 29, offset in relation to each other in the lateral direction X, opening the internal volume to the outside of the support 12. Preferably, the closure plate 22 has a thickness of less than or equal to 1.5 mm, preferably equal to 0.9 millimeters, taken in the elevation direction Z.

The display assembly 14 is designed to display images visible to the user in the upper part of their field of vision when the user looks upwards.

The display assembly 14 comprises two display units 32.

Figure 3:
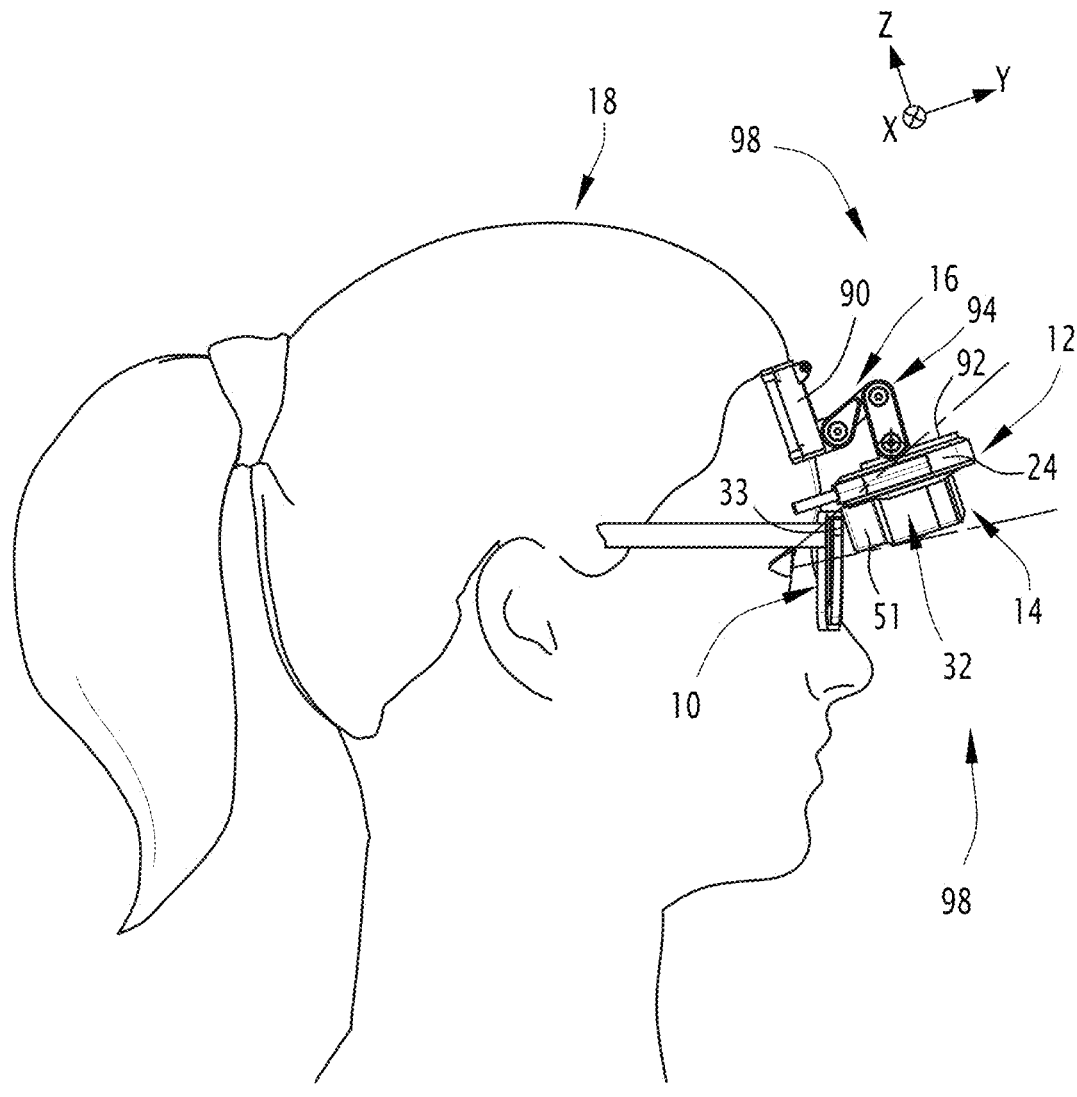
FIG. 3 is a side view of the user and the dual vision device of FIG. 2.

As illustrated in the examples of FIGS. 2 to 4, the two display units 32 are offset from each other in the lateral direction X. The display units 32 are aligned in the transverse direction Y and the elevation direction Z, meaning that the display units 32 are flush on a plane orthogonal to the transverse direction Y and/or the display units 32 are flush on a plane orthogonal to the elevation direction Z.

Each display unit 32 comprises an eyepiece 36 and a screen 38, which are chosen so that each display unit 32 forms an image that is clearly viewable by a distinct eye of the user under the following conditions:

the support 12 is inclined so that the image formed by each display unit 32 is viewable only in the upper part of the field of vision of the user when the user looks upwards, and the distance between the eyes of the user and the entrance of the eyepieces 36 is greater than or equal to a predetermined distance, the predetermined distance being chosen so as to enable the insertion of glasses between the eyes of the user and the display unit 32.

The two display units 32 are thus intended to be placed in front of the eyes of the user 18 to restore a clear image at a distance greater than or equal to the predetermined distance.

The predetermined distance is a distance that provides enough space between an entrance 33 of the display units 32 and the eyes of the user 18 to insert glasses therein, making the dual vision device 10 usable by a majority of users. For example, the predetermined distance is between 20 millimeters and 25 millimeters, particularly between 22 millimeters and 25 millimeters.

Figure 5:
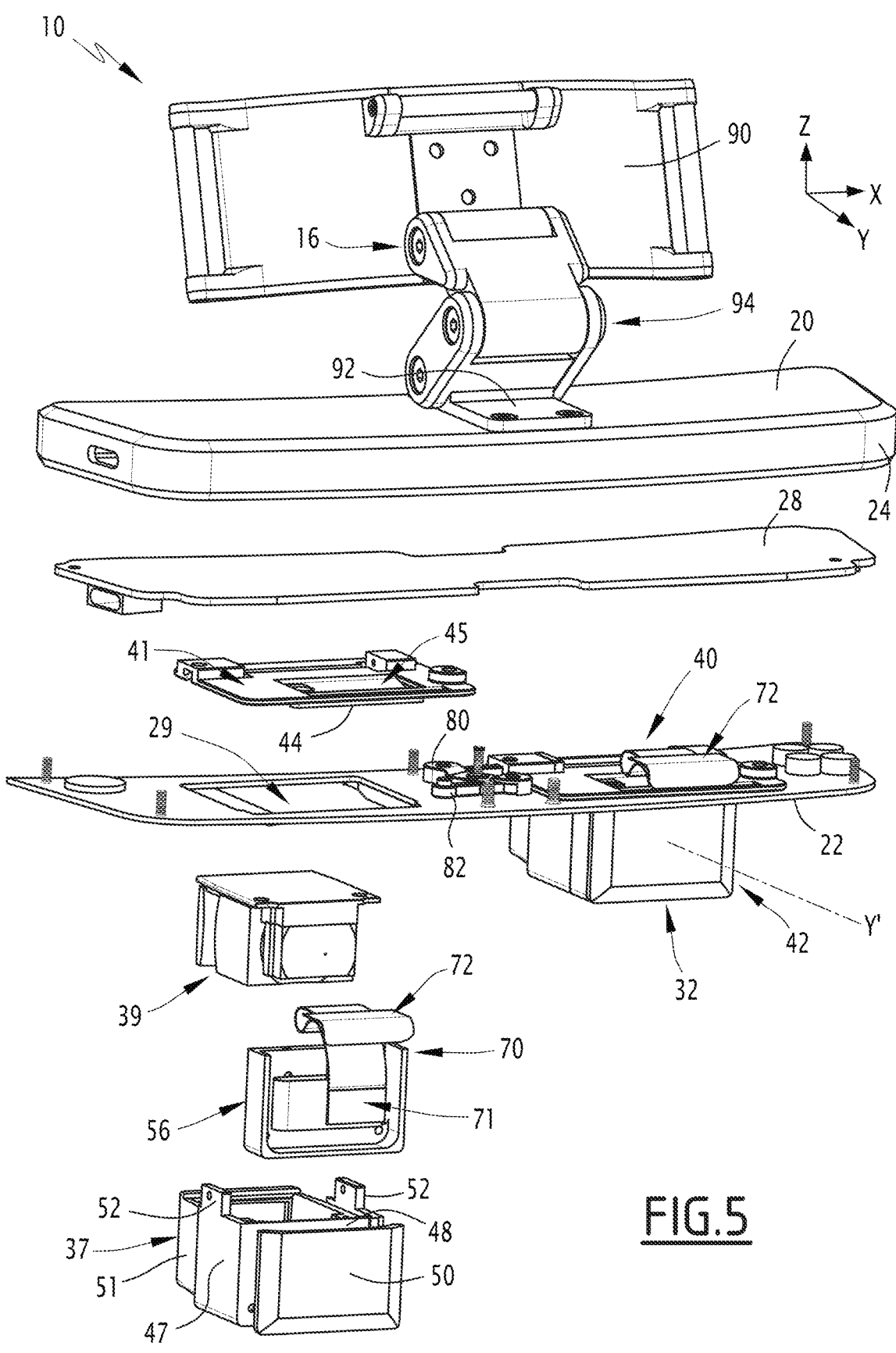
FIG. 5 is an exploded view of an example of a dual vision device.

FIG. 5 presents an exploded view of an example of a dual vision device 10, in which the support 12 and the display assembly 14 comprising the two display units 32 can be distinguished.

Preferably, the display units 32 extend at least partially in projection from the support 12, from the closure plate 22 in the represented example.

Figure 6:
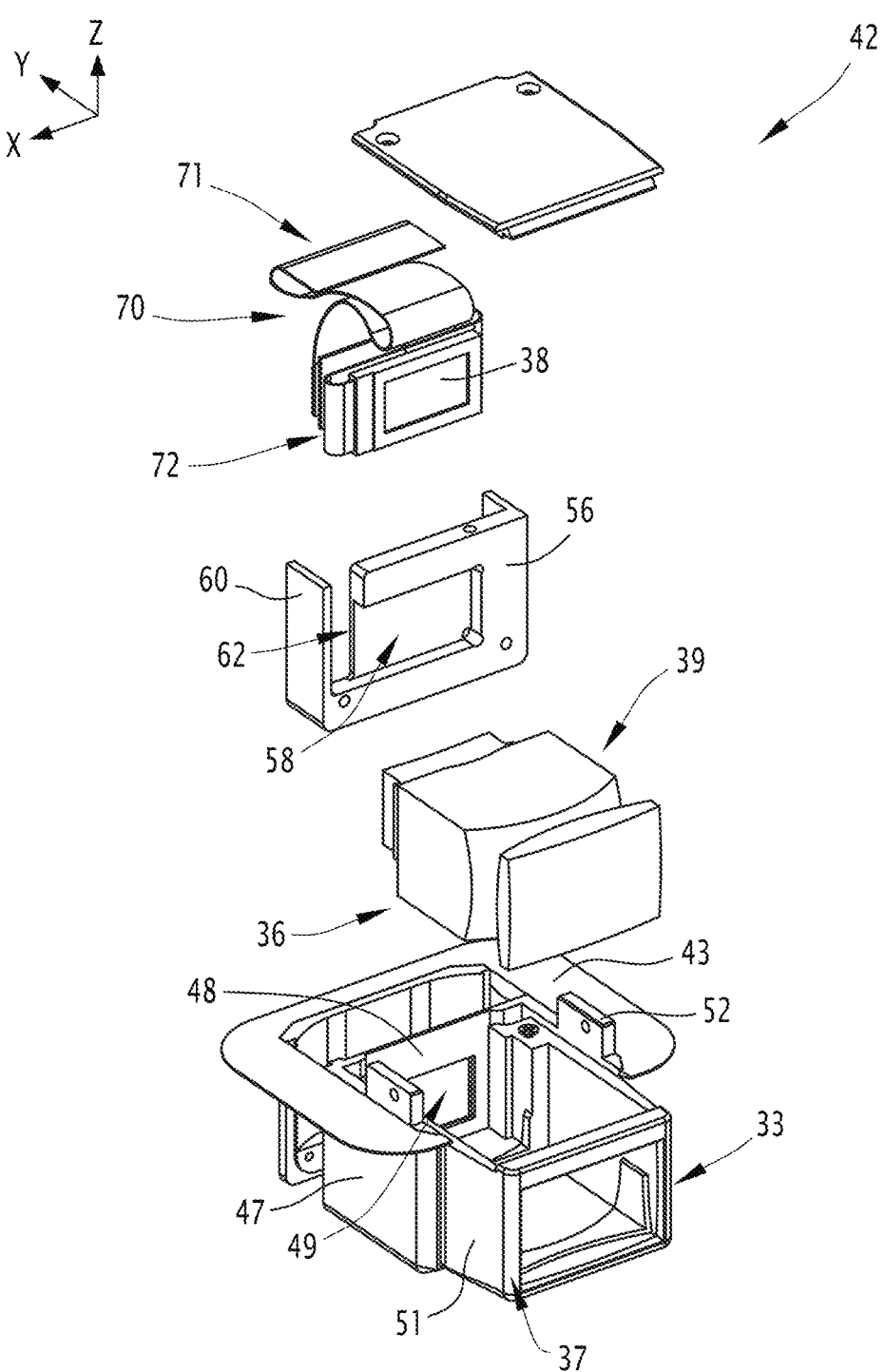
FIG. 6 is an exploded view of an example of a display unit of a dual vision device.

In the examples of FIGS. 5 and 6, the eyepiece 36 is placed between the entrance 33 of the display unit 32 and the screen 38 in the transverse direction Y.

The eyepiece 36 is preferably formed of a set of lenses 39, such as four lenses, placed together. FIG. 6 illustrates a set of lenses 39 comprising four lenses, two of which are glued together. The surface of the lens closest to the entrance of the display unit 32, in the transverse direction Y, is preferably substantially flat, which reduces reflections potentially generated by an external light source. In a variant, the eyepiece 36 comprises a number of lenses less than four or greater than four.

The screen 38 is adapted to display an image that is viewable by the user 18 through the eyepiece 36.

Advantageously, the screen 38 is optimized so that the image formed by the display unit 32 is as wide as possible while being readable without the user having to move their eyes to view the edges of the image, particularly the lateral edges, in the lateral direction X.

For example, the screen 38 has a resolution that is at least in high definition, meaning that the screen 38 has a resolution of greater than or equal to 1920 pixels, taken in the lateral direction X. Such a resolution is sized so as to enable the user to clearly view characters that would be displayed on the screen 38, in particular.

In a variant, or in addition, the screen 38 of each display unit 32 has a rectangular shape whose diagonal is less than or equal to 10 millimeters, preferably less than or equal to 8 millimeters.

Preferably, the screen 38 is an OLED screen (organic light-emitting diode in English, organic electroluminescent diode in French).

In one embodiment example, as illustrated by FIG. 5, each display unit 32 comprises a frame 40 in which the eyepiece 36 and the screen 38 are inserted.

Preferably, the frame 40 has a parallelepiped shape with a conical base at the entrance of the eyepiece 36. This limits the border 37 around the front glass that is part of the eyepiece 36.

As an optional complement or in a variant, the border 37 has a thickness around the entrance of the eyepiece 36 of less than or equal to 2 millimeters, particularly less than or equal to 1.4 millimeters. The thickness of the border 37 is measured in the tangent direction to the contour of the entrance of the eyepiece 26. The thin thickness of the border 37 around the eyepiece 36 prevents the formation of black bands around the image that the user 18 is intended to view, via the second vision, by looking upwards.

In one embodiment example, represented in FIG. 6, the entrance of the eyepiece 36 is substantially in a plane generated by the lateral direction X and the elevation direction Z. The thickness of the border 37 of the frame 40 is then measured in the lateral direction X and the elevation direction Z.

Preferably, as illustrated by FIG. 5, the frame 40 comprises an upper tab 41, located in the internal volume of the support 12, and a lower part 42, located in projection from the closure plate 22 outside the support 12. The upper tab 41 and the lower part 42 of a display unit 32 are fixed to each other on either side of a housing 29. The lower part 42 advantageously has a lower tab 43, whose dimensions in the lateral direction X and the transverse direction Y are greater than that of the housing 29, so as to cover the housing 29. The upper tab 41 and the lower tab 43 are in support on either side of the closure plate 22 of the support 12. The upper tab 41 and the lower tab 43 are intended to ensure the tightness of the support 12 to light and dust at the level of the housings 29. For this purpose, the lower tab 43 has a flared shape, meaning that its section, taken in the lateral direction X and the transverse direction Y, widens near the closure plate 22. Preferably, the dimensions in the lateral direction X and the transverse direction Y of the lower tab 43 are substantially equal to the dimensions of the upper tab 30.

In this example, the upper tab 41 has a substantially rectangular plate shape extending mainly in a plane parallel to the plane of the closure plate 22 and whose dimensions, taken in the transverse direction Y and the lateral direction X, are greater than the dimensions of the housing 29, taken in the transverse direction Y and the lateral direction X.

In this example, the upper tab 41 has a protruding surface 44, which extends in the elevation direction Z. The protruding surface 44 extends in the transverse direction Y over the entire length of the housing 29, and extends in the lateral direction X over a length that is less than that of the housing 29. The protruding surface 44 thus interacts with the housing 29 so as to create a sliding connection in the lateral direction X. The upper tab 41 is guided in translation in relation to the closure plate 22 in the lateral direction X. Preferably, the dimensions in the lateral direction X and the transverse direction Y of the lower tab 43 are equal to the dimensions of the upper tab 30.

An opening 45 is provided in the upper tab 41, the opening 45 being placed opposite the housing 29 in the elevation direction Z.

An example of a lower part 42 of a display unit 32 is represented in FIG. 6. The lower part 42 particularly receives the screen 38 and the eyepiece 36 and comprises the entrance 33 of the display unit 32.

The lower part 42 has a parallelepiped shape with a conical base at the entrance of the eyepiece 36. Advantageously, the entrance of the eyepiece 36 forms the entrance 33 of the display unit 32.

In the example of FIG. 6, the lower part 42 comprises a support wall 46, orthogonal to the elevation direction Z, lateral walls 47, orthogonal to the lateral direction X, and an intermediate wall 48, in which a frame 49 is provided.

Preferably, the frame 49 is made of a material that lets at least part of the visible radiation pass through, such as polymethyl methacrylate (or PMMA, marketed under the name of plexiglass). In a variant, the frame 49 is a simple opening provided in the intermediate wall 48. The frame 49 is intended to let radiation pass from the screen 38 to the entrance 33 of the display unit 32.

In one example embodiment, the lower part 42 also comprises a bottom wall 50, offset in relation to the intermediate wall 48 in the transverse direction Y. The lateral walls 47 and the bottom wall 50 are linked together by the lower tab 43 which extends in projection from the upper end of the lateral walls 47 and the bottom wall 50, taken in the elevation direction Z. A space is formed between the bottom wall 50 and the intermediate wall 48. Protrusions 52 extend from the lateral walls 47 and are intended to be fixed to the upper tab 41 by fixing means.

In this example, the frame 40 also comprises a housing 51 to receive and set the eyepiece 36. The housing 51 is parallelepiped in shape and is received in the lower part 42. The housing 51 has two faces, orthogonal to the transverse direction Y, the two faces being open to enable light to pass over the entire transverse length of the housing 51. The housing 51 has a conical shape at its transverse end furthest from the bottom wall 50, which gives the display unit 32 its conical shape.

In this example, the screen 38 is received in a radiator 56 of the lower part 42, the radiator 56 being positioned between the bottom wall 50 and the intermediate wall 48. The radiator 56 is advantageously sized to fill the space formed between the bottom wall 50 and the intermediate wall 48. The radiator 56 also has a fixing means that enables it to be secured to the upper tab 41.

Preferably, the radiator 56 is made of a thermally conductive material such as aluminum or copper, to dissipate the heat emitted by the screen 38.

In this example, the radiator 56 is a plate in which a receiving housing 58 is provided, in which the screen 38 is received. The receiving housing 58 extends in a plane orthogonal to the transverse direction Y. The radiator 56 is in contact with the bottom wall 50, on the side opposite the receiving housing 58, via spacers 60. The spacers 60 provide a space between the bottom wall 50 and the radiator 56. The radiator also has a through opening 62, passing through the radiator in the transverse direction Y.

In this example, the screen 38 is integral with a rolled band 70 that extends from a lateral edge of the screen 38. The band 70 has a first portion 71 comprising windings in the elevation direction Z and a second portion 72 in which the windings are oriented in the lateral direction X. The band 70 is located through the through opening 62, so as to extend in the space between the bottom wall 50 and the radiator 56. The second portion 72 of the band 70 passes through the opening 45 of the upper tab 41; it is located at least partially in the internal volume of the support 12. The band 70 is particularly intended to ensure the electrical connection between the electronic card 28 and the screen 38. The band 70 is made up of a ribbon of cables to connect the screen 38 to the electronic card 28, for example.

An optical path is thus provided in each display unit 32, between the screen 38 and the entrance 33 of the display unit 32. The optical path passes through the frame 49 and the eyepiece 36 and enables the user 18 to view the image formed on the screen 38 with appropriate magnification to enable viewing the entire image without having to move the eyes.

Advantageously, the frame 40 also has a dioptric adjustment mechanism 74, enabling the user to adjust the focus of each display unit 32.

Figure 8:
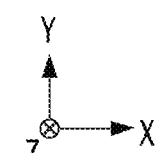
FIG. 8 is a bottom view of the display units and their attachment to a support of the device shown in FIG. 2.
Figure 8:
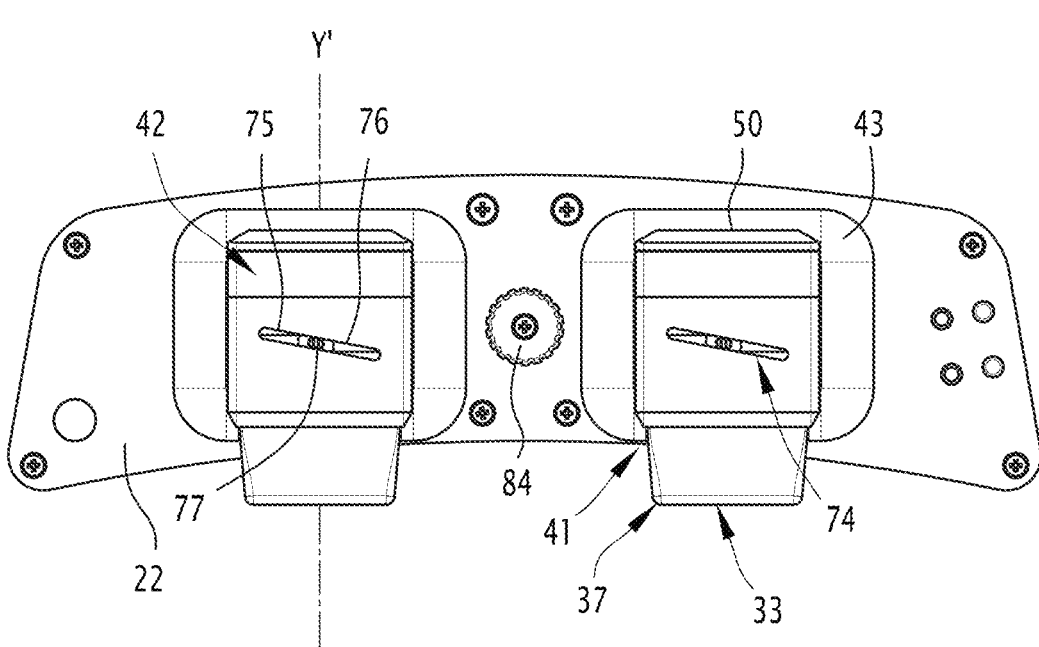

The dioptric adjustment mechanism 74 visible in FIG. 8 enables adjusting the position of the eyepiece 36 in the lower part 42 in the transverse direction Y. Thus, the user 18 can focus on each display unit 32 adapted to each eye.

In the represented example, the dioptric adjustment mechanism 74 enables moving the housing 51, receiving the eyepiece 36, transversely in relation to the screen 38.

In this example, the dioptric adjustment mechanism 74 includes a diagonal groove 75, a lateral groove 76 and an adjustment pin 77 that interacts with the diagonal groove 75 and the lateral groove 76. The diagonal groove 75 is a through groove not parallel to the lateral direction X and the transverse direction Y and is provided in the support wall 46. The lateral groove 76 is provided in a face of the housing 51 and is parallel to the lateral direction X. The adjustment pin 77 is inserted into the lateral groove 76 and the diagonal groove 75, so as to pass through the support wall 46. The adjustment pin 77 is accessible by the user 18 from outside the display unit 32. The movement of the adjustment pin 77 in the diagonal groove 75 generates a force in the lateral direction X and the transverse direction Y. As the adjustment pin 77 is also inserted into the lateral groove 76, the adjustment pin 77 moves in the lateral direction X, and the effort in the transverse direction Y causes the housing 51 to move in the transverse direction Y.

Advantageously, the display assembly 14 comprises an interpupillary adjustment mechanism 78, designed to move the two display units 32 synchronously in the lateral direction X. The interpupillary adjustment mechanism 78 is intended to adjust the spacing between the two display units 32, taken in the lateral direction X, to adapt to the interpupillary distance of the user 18, meaning the spacing between their eyes.

In the example represented, the interpupillary adjustment mechanism 78 is intended to ensure the symmetry of the display units 32 in relation to a symmetry plane orthogonal to the lateral direction X.

Preferably, the interpupillary adjustment mechanism 78 also ensures parallelism between the display units 32, ensuring that the display units 32 are flush on a plane orthogonal to the transverse direction Y and/or on a plane orthogonal to the elevation direction Z when the display units 32 are moved in the lateral direction X.

In one particular example embodiment represented in FIG. 4, the entrances 33 of the display units 32 are thus comprised in the same plane, particularly during the movement of the display units 32 in the lateral direction X through the interpupillary adjustment mechanism 78.

The interpupillary adjustment mechanism 78 is mounted on the closure plate 22 of the support 12.

In particular, the interpupillary adjustment mechanism 78 is linked to the upper tab 41 of each display unit 32, enabling the tabs to cover the space caused by the interpupillary adjustment so as to prevent the entry of light and dust.

Figure 7:
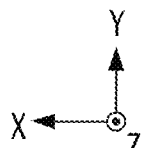
FIG. 7 is a sectional view of the display units and their attachment to a support of the device shown in FIG. 2.
Figure 7:
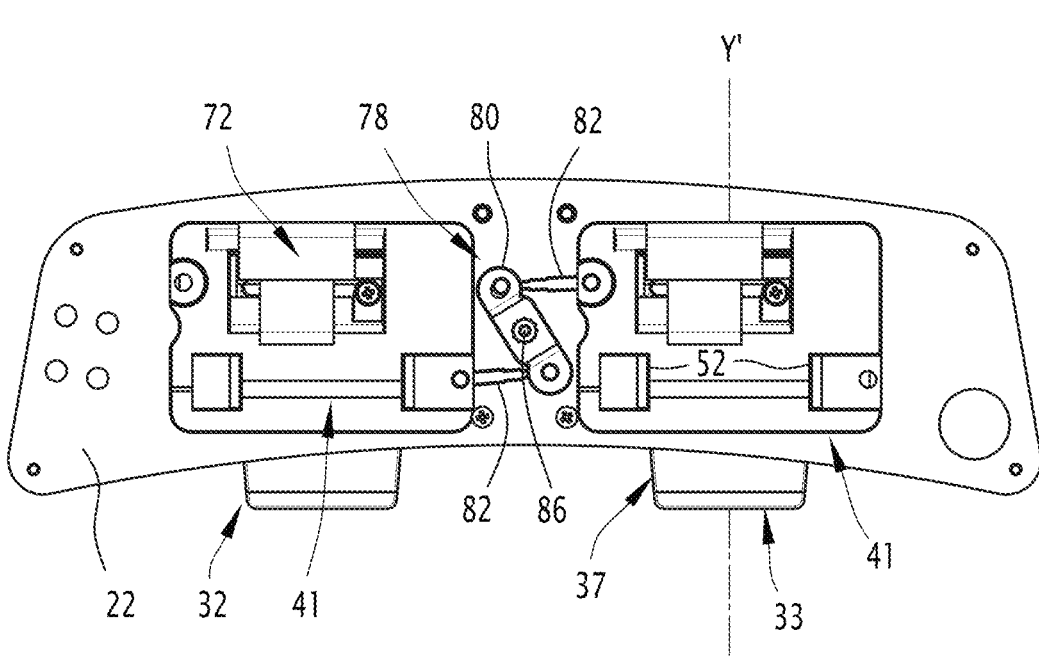

With reference to FIG. 7, the interpupillary adjustment mechanism 78 comprises a yoke 80, mounted mobile in rotation along a yoke axis parallel to the elevation direction Z. The yoke 80 has two ends that are provided equidistant from the rotation axis of the yoke 80.

The yoke 80 is linked in rotation to a rod 82, at each of its ends. Each rod 82 is mounted mobile in rotation in relation to the upper tab 41 of one of the two display units 32.

The rotation of the yoke causes the movement of the rods 82 linked to the upper parts 41 of the display units 16. The movement of the rods 82 generates a force at the insertion of the rods 82 and the upper tabs 41, the generated force having at least one component in the lateral direction X. With the upper parts 41 being mobile in translation in relation to the support 12 in the lateral direction X, the rotation of the yoke 80 involves a symmetrical movement of the upper tabs 30 in relation to the rotation axis of the yoke 80.

Moreover, the interpupillary adjustment mechanism 78 can be locked, so that an interpupillary adjustment that suits the user is not inadvertently misadjusted, when handling the dual vision device 10, for example.

As visible in FIG. 8, the adjustment mechanism comprises a locking screw 83, whose head forms a locking knob 84, in a helical connection in relation to a nut 86 of the adjustment mechanism. The nut 86 is arranged in an appropriate housing of the yoke 80, visible particularly in FIG. 7, and the locking screw 83 acts as a shaft for the rotation of the yoke 80 in relation to the support 12.

The locking knob 84 is mobile in rotation between an unlocked position, in which the yoke 80 is mobile in rotation around the yoke axis in relation to the support 12, and a locked position, in which the yoke is immobile in rotation in relation to the support 12.

In the locked position, the locking knob 84 is supported on the closure plate 22 of the support 12, and the bolted connection between the locking screw 83 and the nut 86 generates a clamping force in the elevation direction Z that blocks the rotation of the yoke 80 around the yoke axis.

In the unlocked position, the locking knob is not supported on the closure plate 22 of the support 12, the bolted connection does not apply a clamping force on the yoke 80, whose rotation around the yoke axis is free.

The locking knob 84 enables locking the distance between the two display units 32 in the lateral direction X, and thus adapting to the interpupillary distance of the user.

The adjustment unit 16 is configured to set and adapt the support 12 to the head of the user 18 in at least one operating position. In the at least one operating position, the display assembly 14 is located in the upper part of the field of vision of the user 18, at a latitude of at least 15°, as represented in FIG. 3. In the at least one operating position of the support 12, the user can view images, particularly video content, through the display units 32 by looking upwards.

FIG. 2 represents a dual vision device 10 in which the support 12 is positioned in an operating position relative to a user. The user has access to a second vision provided by the two display units 32, and the distance between the entrances 33 of the display units 32 and the eyes of the user is large enough to place glasses in particular.

The user represented in FIG. 2 can thus switch from direct vision to the second vision provided by the dual vision device 10 simply by looking upwards, meaning by orienting the direction of their optical axis to a latitude of 15°.

The adjustment unit 16 is articulated so as to be able to adjust the latitude of the support 12 in relation to the user and/or the distance of the entrances 33 of the display units 32 to the eyes of the user.

In an example embodiment, the adjustment unit 16 comprises an attachment plate 90, intended to be positioned on the forehead of the user, a support plate 92, fixed to the support 12, and an articulation system 94, linking the attachment plate 90 and the support plate 92. The articulation system enables at least one degree of freedom of the support 12 in a profile plane orthogonal to the lateral direction X.

Preferably, the adjustment unit 16 has three degrees of freedom in the profile plane P, particularly by being articulated by three pivot connections in the lateral direction X, as represented in FIG. 3. In a variant, the adjustment unit 16 is articulated by two pivot connections in the lateral direction X.

The attachment plate 90 is equipped with a fixing mechanism (not represented), enabling securing the attachment plate 90 on the head of the user 18. The fixing mechanism comprises elastic bands or a helmet, for example.

In a variant, the attachment plate 90 has another shape, adapted to be positioned on a helmet, for example.

FIG. 3 enables visualizing the field of vision of the user wearing the dual vision device 10 in an operating position according to the latitude. A direct vision zone 98, in which the user 18 sees naturally, is distinguished from an obstructed vision zone 99 by the device 10. The height of the support 12 and the display assembly 14, taken in the elevation direction Z, is advantageously less than 50 mm, preferably less than 30 mm, to ensure that the obstructed vision zone 99 remains small in relation to the direct vision zone 98.

Moreover, as illustrated in FIG. 4, the conical shape at the entrance of each display unit 32 reduces the size of the obstructed vision zones 99.

An example of the operation of the dual vision device 10 will now be described.

A user wishing to use the dual vision device 10 positions the attachment plate 90 of the adjustment unit 16 on their forehead and uses the fixing system to secure the dual vision device 10 to their head. The user then adapts the support 12 of the vision device so as to position the display units 32 in front of their eyes, in an operating position. The support 12 is then in the upper position of the field of vision of the user, the display units 32 being at the predetermined distance from the eyes of the user.

Subsequently, the user provides a video data stream to the dual vision device 10 through the data reading system of the electronic card 28. The video data stream read by the electronic card is then transcribed on the screens 38 of the display units 32.

The user 18 then wishing to adjust the interpupillary distance, to adapt to their vision, then rotates the locking knob 84 to switch it to the unlocked position. The user then applies a force in the lateral direction X and moves the display units in the lateral direction X symmetrically to the yoke axis. Once the interpupillary distance is correctly adjusted, the user switches the locking knob 84 to the locked position.

By looking upwards towards the adjustment units 32, the user views the video data stream displayed on the screens 38.

Optionally, if the image is not clearly viewable, the user uses the dioptric adjustment mechanism 74 to adjust the focal distance of the eyepiece 36 so that the image is viewable. The user then closes one eye and grabs the adjustment pin 77 to move the eyepiece 36 and focus. Once the first display unit 32 is adjusted, the user adjusts the second display unit 32 in a similar manner.

Thus, the dual vision device 10 enables the user 18 to switch from a direct vision zone to a second vision zone, displaying the input video data stream, by simply looking into the upper part of their field of vision.

Moreover, the interpupillary adjustment mechanism 78 and the dioptric adjustment mechanism 74 make the dual vision device 10 adaptable to a large number of users.

Finally, the distance between the display units 32 and the eyes of the user 18 is large enough for the user 18 to access the second vision while wearing glasses.

Some details concerning the device presented on FIGS. 1 to 8 will now be set out in the following paragraphs.

In this example, the screen 38 and the eyepiece 36 are aligned along the transverse direction Y. By "aligned", we mean that there is an axis Y' substantially parallel to the transverse direction Y which crosses the center of the screen 38 and the one of the eyepiece 36. That is, the optical path is substantially straight, in this case is parallel with the transverse direction Y, except for the refraction due to the passage of light from one medium to another.

Preferably, the screen 38 and the eyepiece 36 are the only components of the optical system of each of the display unit 32. Particularly, the display unit 32 is devoid of mirror or reflective surface.

In the example shown for example in FIG. 2, the display units 16 partially extend out of the support 12 according to the elevation direction Z.

In a variant or in addition, the depth of one of the display unit 32 taken along the transverse direction Y, is less than 4 centimeters.

The adjustment unit 16 according to the present disclosure is in particular devoid of lateral branches intended to rest on the user's ears, which facilitates the use of the device 10 by a wearer of glasses.

A dual vision device 210 corresponding to a second embodiment of the present disclosure will now be described, with reference to FIG. 9, by difference with the previously described embodiment. The references concerning the same elements have been incremented by 200.

The display units 232 have a protruding portion 430, projecting from the support 212 along the elevation direction Z, and an inner (non-visible) portion located in the support 212.

The screen 238 of each display unit 232 is received in the internal portion.

The screen 238 is then configured to project an image into the eyepiece 236.

The screen 238 and the eyepiece 236 are configured so that the image can be viewed by the user through the eyepiece 236.

For example, the eyepiece 236 comprises at least one reflective surface to direct the light beam emitted by the screen 238 towards the user's eyes.

The eyepiece 236 preferably comprises, for example, a light guide capable of circulating the light beam from an input surface, facing the screen 238, to the entrance of the eyepiece 236, so that it is viewable by the user.

The guiding of the light beam by the light guide of eyepiece 236 is for example achieved by diffraction or total internal reflection.

Thus, in this embodiment, the screen 238 and the eyepiece 236 are not aligned along the transverse direction Y, but put one after the other along the elevation direction Z, so as to guide the optical path from the screen 238 towards the eyepiece 236 along the elevation direction Z, then to redirect it towards the user's eye for example by means of the reflective surface of the eyepiece 236.

Figure 9:
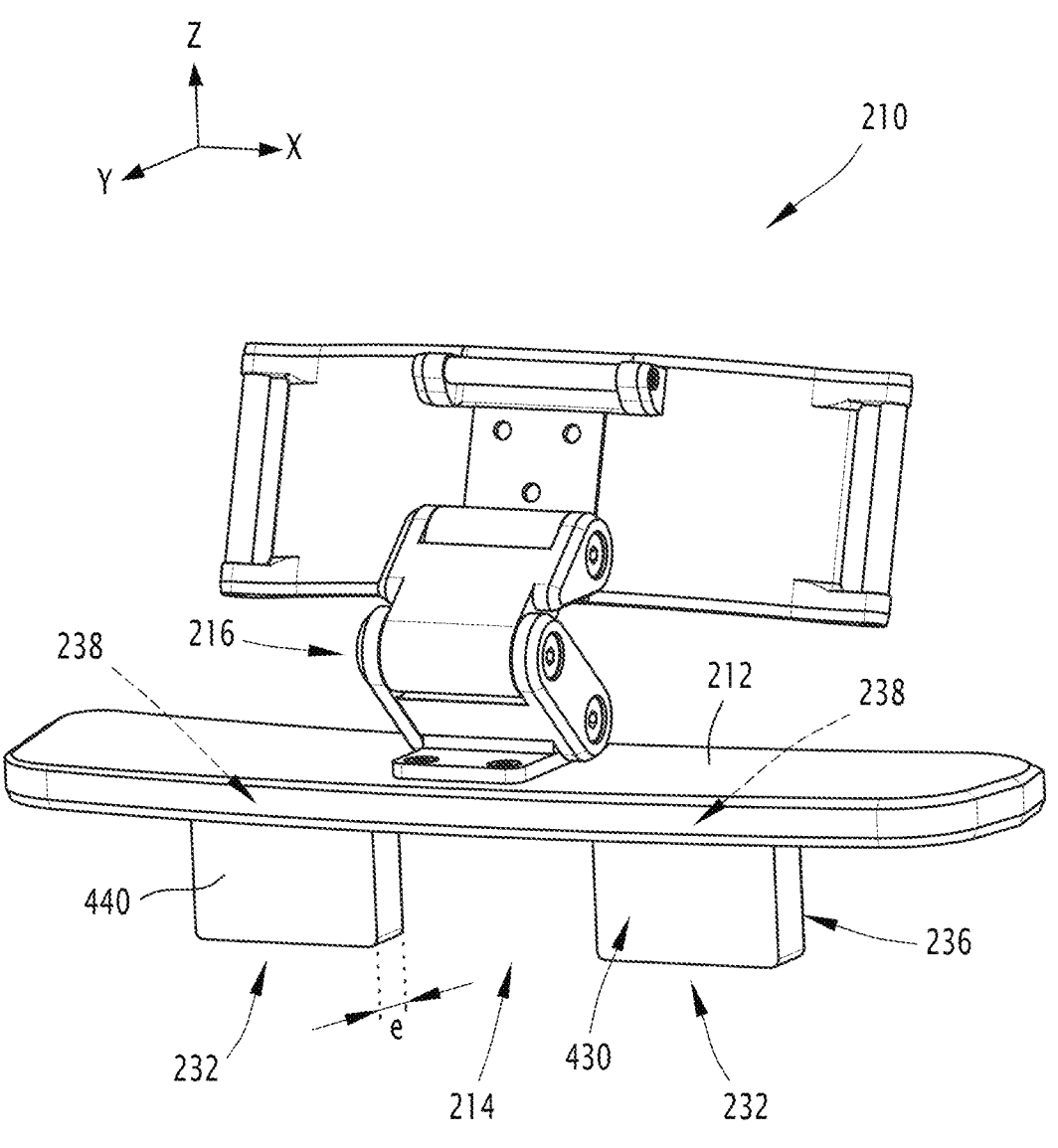
FIG. 9 is a schematic representation of a dual vision device according to a second example.

Preferably, the depth, denoted as e and shown in FIG. 9, of the protruding portion 430 of each display unit 232 taken along the transverse direction Y is 5 millimeters or less, particularly 4 millimeters or less.

Preferably, each display unit 232 is provided with an electronic cover 440, to make the second vision independent of natural vision. The electronic cover 440 is then arranged opposite the entrance of the eyepiece 236 according to the transverse direction Y and closes the display unit 232. The electronic cache 440 is for example formed of a monochrome liquid crystal screen.

The skilled person will understand that the previously described embodiments and variants can be combined to form new embodiments, provided they are technically compatible.

What is claimed is:

1. A dual vision device designed to generate a second vision, independent of a direct vision, in addition to the direct vision of a user, the second vision being located in an upper part of a field of vision of the user so that the user has access to the second vision only by looking upwards, and otherwise has access to their own direct vision, the dual vision device comprising:

a support for a display assembly;

an adjustment unit configured to set and adapt the support to a head of the user so that the display assembly carried by the support is viewable only in the upper part of the field of vision of the user when the user looks upwards; and the display assembly carried by the support, the display assembly comprising two display units configured to generate the second vision in the upper part of the field of vision of the user, each display unit of said two display units comprising an eyepiece and a screen chosen so that each display unit forms an image viewable clearly by a distinct eye of the user under the following conditions:

the support is inclined so that the image formed by each display unit is viewable only in the upper part of the field of vision of the user when the user looks upwards; and a distance between eyes of the user and an entrance of the eyepieces is greater than or equal to a predetermined distance, the predetermined distance being chosen so as to enable an insertion of glasses between the eyes of the user and said two display units.

2. The dual vision device according to claim 1, wherein the predetermined distance is between 20 millimeters and 28 millimeters.

3. The dual vision device according to claim 1, wherein the predetermined distance is between 22 millimeters and 25 millimeters.

4. The dual vision device according to claim 1, wherein the screen of each display unit has a size chosen so that the image formed by the respective display unit is readable without the user having to move their eyes laterally to view edges of the image.

5. The dual vision device according to claim 1, wherein each eyepiece is formed of a set of lenses placed together, the surface of the set of lenses at the entrance of the eyepiece being substantially flat.

6. The dual vision device according to claim 5, wherein each eyepiece is formed of a set of at least four lenses placed together.

7. The dual vision device according to claim 1, wherein each display unit comprises a frame in which the screen and the eyepiece are inserted, the frame having a parallelepiped shape with a conical base at the entrance of the eyepiece.

8. The dual vision device according to claim 1, wherein each display unit comprises a frame in which the screen and the eyepiece are inserted, the frame having a border, at the entrance of the eyepiece, whose thickness is less than or equal to 2 millimeters.

9. The dual vision device according to claim 8, wherein the thickness of the border is less than or equal to 1.4 millimeters.

10. The dual vision device according to claim 1, wherein each display unit comprises a frame in which the screen and the eyepiece are inserted, the frame having a dioptric adjustment mechanism enabling the user to adjust a focus of each display unit.

11. The dual vision device according to claim 1, wherein the support comprises a closure plate with two housings in which the two display units are received, the display assembly comprising an interpupillary adjustment mechanism mounted on the closure plate and designed to synchronize movement of the two display units, the interpupillary adjustment mechanism comprising a yoke on which two rods are mounted and a locking knob for a rotation of the yoke, each rod being fixed to a distinct display unit enabling the synchronous movement of each display unit when the locking knob is in an unlocked position.

12. The dual vision device according to claim 11, wherein the two display units also comprise for each housing two tabs on either side of the closure plate designed to cover a space caused by the interpupillary adjustment mechanism to prevent an entry of light and dust.

13. The dual vision device according to claim 1, wherein at least one display unit of said two display units comprises an inner portion located inside the support and a protruding portion projecting from the support, and wherein the screen is received inside the inner portion, the eyepiece being received inside the protruding portion.

14. The dual vision device according to claim 13, wherein the protruding portion of the at least one display unit has a depth less or equal to 4 millimeters.

15. A method for generating a second vision, independent of a direct vision of a user, the second vision being located in an upper part of a field of vision of the user so that the user has access to the second vision by only looking upwards, and otherwise has access to their direct vision, the method being implemented by a dual vision device according to claim 1, the method comprising:

fixing and adapting the support of the dual vision device to a head of the user so that the display assembly carried by the support is viewable only in the upper part of the field of vision of the user when the user looks upwards; and visualizing by the user of the second vision provided by the dual vision device in the upper part of the field of vision of the user when the user looks upwards, and of their direct vision otherwise.

\* \* \* \* \*